US012457490B2

(12) United States Patent
Kuravangi-Thammaiah et al.

(10) Patent No.: US 12,457,490 B2
(45) Date of Patent: Oct. 28, 2025

(54) ON-DEMAND SUBSCRIPTION CONCEALED IDENTIFIER (SUCI) DECONCEALMENT FOR SELECT APPLICATIONS

(71) Applicant: Verizon Patent and Licensing Inc., Basking Ridge, NJ (US)

(72) Inventors: Shanthala Kuravangi-Thammaiah, Keller, TX (US); Ye Huang, San Ramon, CA (US); Scott Sheets, Aurora, TX (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 280 days.

(21) Appl. No.: 17/748,459

(22) Filed: May 19, 2022

(65) Prior Publication Data

US 2023/0379696 A1 Nov. 23, 2023

(51) Int. Cl.
*H04W 12/02* (2009.01)
*H04W 8/26* (2009.01)
*H04W 12/06* (2021.01)

(52) U.S. Cl.
CPC ............. *H04W 12/02* (2013.01); *H04W 8/26* (2013.01); *H04W 12/06* (2013.01)

(58) Field of Classification Search
CPC ..... H04W 12/00; H04W 12/02; H04W 12/03; H04W 12/06; H04W 12/062; H04W 12/065; H04L 63/08; H04L 63/0428; H04L 63/10; H04L 63/0442
See application file for complete search history.

(56) References Cited

U.S. PATENT DOCUMENTS

| | | | |
|---|---|---|---|
| 2020/0359218 A1* | 11/2020 | Lee | H04M 15/55 |
| 2022/0272533 A1* | 8/2022 | Lei | H04W 12/06 |
| 2023/0164555 A1* | 5/2023 | Starsinic | H04L 65/1073 |
| | | | 455/411 |
| 2023/0247426 A1* | 8/2023 | Guo | H04W 12/041 |
| | | | 726/6 |
| 2023/0292115 A1* | 9/2023 | Mavureddi Dhanasekaran | |
| | | | H04L 63/0414 |
| 2023/0345246 A1* | 10/2023 | Khare | H04W 12/069 |

* cited by examiner

*Primary Examiner* — William R Korzuch
*Assistant Examiner* — Sayeda Salma Nahar

(57) ABSTRACT

A network device executing a Network Exposure Function (NEF) receives, from a requestor, an on-demand Subscription Concealed Identifier (SUCI) deconcealment request associated with a mobile network subscriber. The NEF sends a second SUCI deconcealment request to a network function (NF) in the mobile network, where the second SUCI deconcealment request includes a SUCI associated with the mobile network subscriber. The NEF receives, from the NF, a SUCI deconcealment response that includes a Subscription Permanent Identifier (SUPI), associated with the mobile network subscriber, decrypted from the SUCI by the NF, and forwards the SUCI deconcealment response to the requestor.

21 Claims, 5 Drawing Sheets

ON-DEMAND SUBSCRIPTION CONCEALED IDENTIFIER (SUCI) DECONCEALMENT FOR SELECT APPLICATIONS

BACKGROUND

In mobile networks, network operators assign a unique identifier to each Subscriber Identity Module (SIM) card for each mobile device. This unique identifier may include an International Mobile Subscriber Identity (IMSI) (e.g., in Fourth Generation (4G) networks) or a Subscription Permanent Identifier (SUPI) (e.g., in Fifth Generation (5G) networks). In 4G networks, the mobile device may have to reveal its IMSI as plain-text during certain mobile network interactions, such as, for example, when the mobile device registers with the mobile network for the first time and has not yet been assigned a temporary identifier. A "man-in-the-middle" device, such as a "fake" base station, can intercept the plain-text IMSI transmitted between the mobile device and the mobile network (known as "IMSI catching") and use it to track the mobile device.

DETAILED DESCRIPTION OF EXAMPLE EMBODIMENTS

The following detailed description refers to the accompanying drawings. The same reference numbers in different drawings may identify the same or similar elements. The following detailed description does not limit the invention.

In 5G mobile networks, the problem of IMSI catching has been addressed through the use of SUCIs that include ciphertext which identifies mobile devices. Instead of transmitting plaintext IMSIs to the mobile network, in 5G, mobile devices use an encryption scheme to encrypt at least a portion of a SUPI assigned to a mobile device's SIM card to generate a SUCI. The SUCI, including the SUPI in ciphertext, is transmitted from the mobile device to the mobile network when registering with the network, or performing other actions with the network that require identification of the mobile device. The mobile network, when authenticating the mobile device, for example, decrypts the ciphertext contained in the SUCI to obtain the mobile device's SUPI. The mobile network, to maintain the security of mobile subscriber identities, does not store the SUCI-to-SUPI association for any mobile subscriber. Currently, mobile networks do not have the capability to correlate SUCIs with their corresponding SUPIs at the on-demand request of an entity or network device.

Example embodiments described herein enable on-demand requests for SUCI deconcealment to be handled by a specialized Network Exposure Function (NEF) installed in the mobile network. The NEF, as described herein, receives SUCI deconcealment requests from an entity, such as an application executing in a Multi-Access Edge Computing (MEC) platform in an edge network, or an application executing in a network device located in a network that is external to the mobile network, and authenticates the entity. If authentication is successful, the NEF sends a SUCI deconcealment request to another network function in the mobile network that performs a SUCI deconcealment service. That network function, upon receipt of the SUCI deconcealment request, decrypts a ciphertext portion of the SUCI to retrieve the original plaintext SUPI associated with the mobile subscriber, and returns the decrypted SUPI to the NEF. The NEF forwards the decrypted SUPI to the requesting entity.

Figure 1:
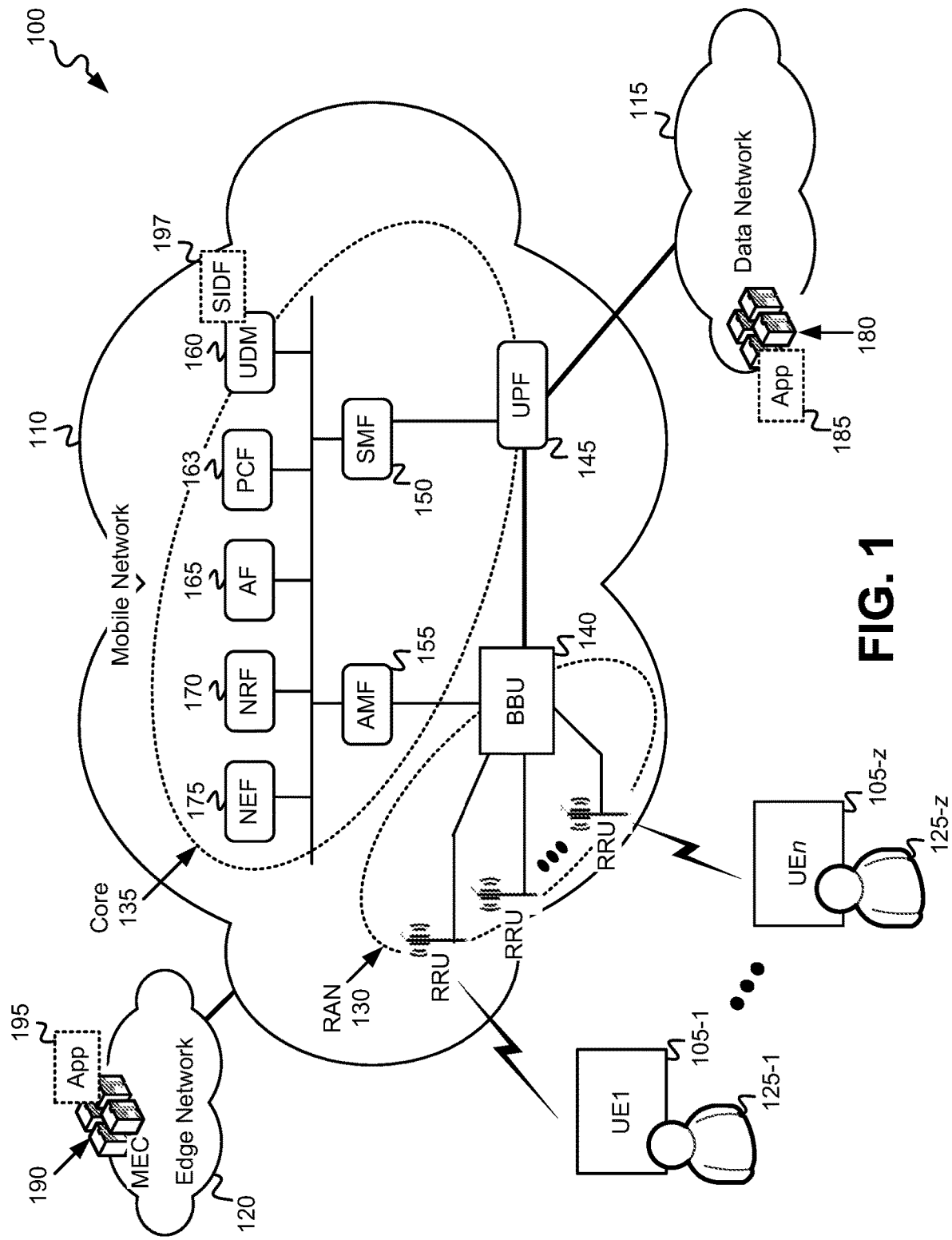
FIG. 1 depicts an example of a network environment in which on-demand Subscription Concealed Identifier (SUCI) deconcealment may be performed for select applications.

FIG. 1 depicts an example of a network environment 100 in which on-demand SUCI deconcealment may be performed for select applications. As shown, network environment 100 may include user equipment devices (UEs) 105-1 through 105-z (generically referred to herein as a "UE 105" or "UEs 105"), a mobile network 110, a data network(s) 115, and at least one edge network 120.

UEs 105-1 through 105-z may each include any type of device having a communication capability such as, for example, a wireless communication capability. UEs 105 may include, for example, a laptop, palmtop, wearable, or tablet computer; a cellular phone (e.g., a "smart" phone); a Voice over Internet Protocol (VoIP) phone; an audio speaker (e.g., a "smart" speaker); a video gaming device; a music player (e.g., a digital audio player); a digital camera; a device in a vehicle; a wireless telematics device; an Augmented Reality/Virtual Reality (AR/VR) headset or glasses; or an Internet of Things (IoT) or Machine-to-Machine (M2M) device. A user may carry, use, administer, and/or operate each UE 105. A user 125-1 is shown in association with UE 105-1 and a user 125-z is shown in association with UE 105-z. A user 125 may alternatively be referred to herein as a "subscriber 125."

Mobile network 110 may include a Public Land Mobile Network (PLMN) (referred to herein as a "mobile network 110" or a "network 110") and possibly one or more other networks (not shown). Mobile network 110 may be composed of other sub-networks, such as a Radio Access Network (RAN) 130 and a core network 135. RAN 130 may include various types of radio access equipment that implement Radio Frequency (RF) communication with UEs 105. The radio access equipment of RAN 130 may include, for example, multiple Remote Radio Units (RRUs) and at least one baseband unit (BBU) 140 (only a single BBU 140 is shown in FIG. 1, however, RAN 130 may include multiple BBUs). Each of the RRUs includes devices that operate as a radio function unit which transmit and receive RF signals to/from UEs 105. BBU 140 interconnects with the distributed RRUs of RAN 130 via fronthaul links or a fronthaul network. RAN 130 may additionally include other nodes, functions, and/or components not shown in FIG. 1. Though not shown in FIG. 1, in some implementations, BBU 140 may be functionally split into a centralized unit (CU) and one or more distributed units (DUs).

Core network 135 includes network devices that host and execute network functions (NFs) that operate the mobile network 110 including, among other NFs, mobile network access management, session management, and policy control NFs. In the example network environment 100 of FIG. 1, core network 135 is shown as including a 5G mobile network that further includes 5G NFs, such as a User Plane Function (UPF) 145, a Session Management Function (SMF) 150, an Access and Mobility Management Function (AMF) 155, a Unified Data Management (UDM) function 160, a Policy Control Function (PCF) 163, an Application Function (AF) 165, a Network Repository Function (NRF) 170, and a Network Exposure Function (NEF) 175. UPF 145, SMF 150, AMF 155, UDM 160, PCF 163, AF 165, NRF 170, and NEF 175 may be implemented as virtual network functions (VNFs) within mobile network 110.

UPF 145 may act as a router and a gateway between mobile network 110 and data network 115, and forwards session data between data network 115 and RAN 130. Though only a single UPF 145 is shown in FIG. 1, mobile network 110 may include multiple UPFs 145 at various locations in network 110. SMF 150 performs session management, allocates network addresses to UEs 105, and selects and controls UPFs 140 for data transfer. AMF 155 performs authentication, authorization, and mobility management for UEs 105.

UDM 160 manages data for user access authorization, user registration, and data network profiles. UDM 160 may include, or operate in conjunction with, a User Data Repository (UDR-not shown) which stores user data, such as customer profile information, customer authentication information, user-subscribed network slice information, and encryption keys. UDM 160 may additionally host a Subscriber Identity Deconcealing Function (SIDF) 197 that decrypts ciphertext portions of SUCIs to reveal the plaintext of each subscriber's SUPI. SIDF 197 may receive, via NEF 175, an on-demand SUCI deconcealment request from AF 165 or from an app 185 or 195 and, in response, may decrypt the SUCI and return the decrypted SUPI to the NEF 175 for return to the requesting entity.

PCF 163 may provide policy rules for control plane functions (e.g., for network slicing, roaming, and/or mobility management) and may access user subscription information for policy decisions. AF 165 may provide session related information to PCF 163 in support of policy control rule generation, may access subscription information for policy decisions, may access NEF 175, and may provide application services to subscribers.

NRF 170 operates as a centralized repository of information regarding NFs in mobile network 110. NRF 170 enables NFs (e.g., UPF 140, SMF 145, AMF 150, UDM 160) to register and discover each other via an Application Programming interface (API). NRF 170 maintains an updated repository of information about the NFs available in mobile network 110, along with information about the services provided by each of the NFs. NRF 170 further enables the NFs to obtain updated status information of other NFs in mobile network 110. NRF 170 may, for example, maintain profiles of available NF instances and their supported services, allow NF instances to discover other NF instances in mobile network 110, and allow NF instances to track the status of other NF instances.

NEF 175 may, as described herein, interact with AF 165, NRF 170, and/or UDM 160 to facilitate the provision of an on-demand SUCI deconcealment service to, for example, app 185 executed by a network device in data network 115 or app 195 executed by a MEC in edge network 120. NEF 175 receives a SUCI associated with a mobile subscriber 125 and/or a UE 105 and an associated SUCI deconcealment request from, for example, app 185 or app 195, and returns a SUPI decrypted from the SUCI to the requesting app 185 or app 195.

Data network 115 may include one or more interconnected networks, such as local area networks (LANs), wide area networks (WANs), metropolitan area networks (MANs), and/or the Internet that are external to, and connected to, mobile network 110. Data network 115 may connect with UPF(s) 140 of mobile network 110. Data network 115 may include one or more network devices 180 (e.g., a data center) that execute at least one application (app) 185. App 185 may provide content/data, a network service(s), and/or results of execution of one or more functions to UEs 105. App 185 may further request SUCI deconcealment to obtain a decrypted SUPI for use in one of its network services or functions. App 185 may not, in some implementations, be associated with providing content/data, a network service(s), and/or results of execution of functions to UEs 105, but may be involved with obtaining SUPIs for certain UEs 105 (e.g., an app 185 executed by a law enforcement agency to request a SUPI for a UE 105 currently active in mobile network 110). App 185, upon installation in the network device in data network 115, may, in some implementations, register with a SUCI deconcealment service (e.g., via NEF 175) such that app 185 may subsequently be authenticated and authorized to send SUCI deconcealment requests. Registration of app 185 with the SUCI deconcealment service may, in some implementations, involve exchange of authentication data (e.g., a token or certificate) between app 185 and NEF 175.

Edge network 120 includes, or may be connected to, one or more edge computing data centers (e.g., a Multi-Access Edge Computing (MEC) platform), or other edge devices, that enable the movement of traffic and network services from core network 135 and/or data network 115 towards the edge of network environment 100 and closer to certain destination devices (e.g., certain UEs 105). Instead of sending data to core network 135 for processing, routing, and transport, edge network 120 handles the data closer to certain destination devices, thereby reducing latency. Edge network 120 may include at least one MEC platform 190 (hereinafter "MEC 190") that hosts at least one app 195 that provides content/data, a network service, and/or results of the execution of one or more functions to UEs 105. App 195 may further request SUCI deconcealment to obtain a decrypted SUPI for use in one of its network services or functions. App 195 may not, in some implementations, be associated with providing content/data, a network service(s), and/or results of execution of functions to UEs 105, but may be involved with obtaining SUPIs for certain UEs 105 (e.g., an app 195 executed by an entity to request SUPIs for UEs 105 currently using services provided by MEC 190). App 195, upon installation in the MEC 190 in edge network 120, may, in some implementations, register with a SUCI deconcealment service (e.g., via NEF 175) such that app 195 may subsequently be authenticated and authorized to send SUCI deconcealment requests. Registration of app 195 with the SUCI deconcealment service may, in some implementations, involve exchange of authentication data (e.g., a token or certificate) between app 195 and NEF 175.

MEC 190 may be located in proximity to a particular geographic location or region, such as, for example, in proximity to a particular city (e.g., city center) or a particular venue (e.g., stadium, theme park, etc.). Installation of MEC 190 in proximity to the particular geographic location enables UEs 105 to access low-latency network services at the particular location. The low-latency network services may include, for example, MEC 190 hosting app 195 for access by UEs 105 at the geographic area or region. Though not shown in FIG. 1, edge network 120 may include additional instances of one or more of the NFs implemented in core network 135 (e.g., UPF 145, AMF 155, NEF 175).

The configuration of network components of the example network environment 100 of FIG. 1 is for illustrative purposes. Other configurations may be implemented. Therefore, network environment 100 may include additional, fewer, and/or different components that may be configured in a different arrangement than that depicted in FIG. 1. For example, core network 135 may include other NFs not shown in FIG. 1. As a further example, though mobile network 110 is depicted in FIG. 1 as a 5G network having 5G network components/functions, mobile network 110 may alternatively include a 4G or 4.5G network with corresponding network components/functions, or a hybrid 5G/4G network that includes certain components of both a Next Generation network (e.g., a 5G network) and a 4G Long Term Evolution (LTE) network. Mobile network 110 may alternatively include another type of Next Generation network, other than the 5G network shown in FIG. 1. Additionally, though only a single instance of each of the NFs UPF 145, SMF 150, AMF 155, UDM 160, PCF 163, AF 165, NRF 170, and NEF 175 is shown in FIG. 1, mobile network 110 may include multiple instances of each of these NFs. For example, if mobile network 110 implements network slicing, then each of the configured network slices may include its own SMF 145, PCF 165, and UPF 140. Each of the NFs described above may be installed in, and be executed by, a network device residing in mobile network 110, or in another network (e.g., in an edge or a far edge network). A single network device may host and execute one or more of the NFs described above, and mobile network 110 may include at least one network device, or may have multiple (e.g., numerous) network devices.

Figure 2:
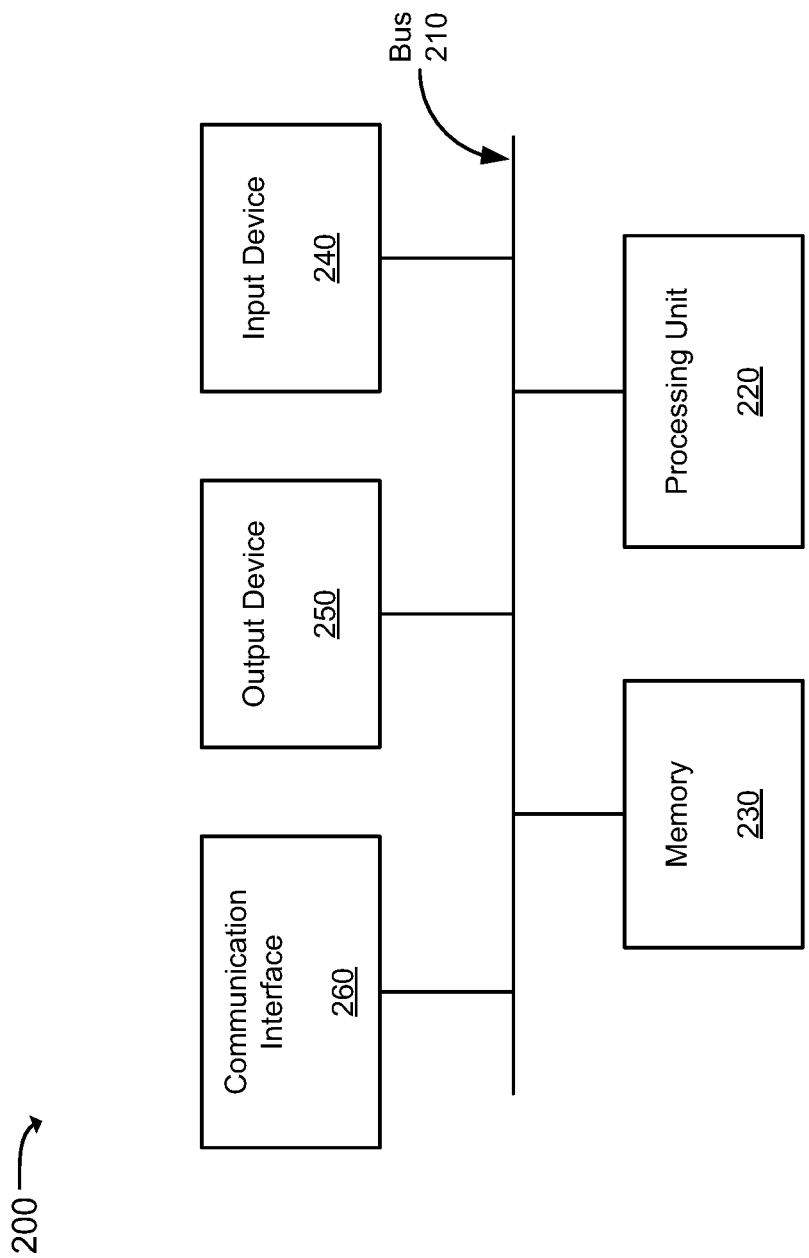
FIG. 2 is a diagram that depicts exemplary components of a network device as referred to herein.

FIG. 2 is a diagram that depicts exemplary components of a network device 200 (referred to herein as a "network device" or a "device"). UEs 105, the RRUs of RAN 125, and BBU 140 may each include components that are the same as, or similar to, those of device 200 shown in FIG. 2. Furthermore, each of the NFs UPF 145, SMF 150, AMF 155, UDM 160, PCF 163, AF 165, NRF 170, and NEF 175 may be implemented by a network device that includes components that are the same as, or similar to, those of device 200. Some of the NFs UPF 145, SMF 150, AMF 155, UDM 160, PCF 163, AF 165, NRF 170, and NEF 175 may be implemented by a same device 200 within mobile network 110, while others of the functions may be implemented by one or more separate devices 200 within mobile network 110.

Device 200 may include a bus 210, a processing unit 220, a memory 230, an input device 240, an output device 250, and a communication interface 260. Bus 210 may include a path that permits communication among the components of device 200. Processing unit 220 may include one or more processors or microprocessors which may interpret and execute instructions, or processing logic. Memory 230 may include one or more memory devices for storing data and instructions. Memory 230 may include a random access memory (RAM) or another type of dynamic storage device that may store information and instructions for execution by processing unit 220, a Read Only Memory (ROM) device or another type of static storage device that may store static information and instructions for use by processing unit 220, and/or a magnetic, optical, or flash memory recording and storage medium. The memory devices of memory 230 may each be referred to herein as a "tangible non-transitory computer-readable medium," "non-transitory computer-readable medium," or "non-transitory storage medium." In some implementations, the processes/methods set forth herein can be implemented as instructions that are stored in memory 230 for execution by processing unit 220.

Input device 240 may include one or more mechanisms that permit an operator to input information into device 200, such as, for example, a keypad or a keyboard, a display with a touch sensitive panel, voice recognition and/or biometric mechanisms, etc. Output device 250 may include one or more mechanisms that output information to the operator, including a display, a speaker, etc. Input device 240 and output device 250 may, in some implementations, be implemented as a user interface (UI) that displays UI information and which receives user input via the UI. Communication interface 260 may include a transceiver(s) that enables device 200 to communicate with other devices and/or systems. For example, communication interface 260 may include one or more wired and/or wireless transceivers for communicating via mobile network 110 and/or data network 115. In the case of RRUs of RAN 130, communication interface 260 may further include one or more antenna arrays for implementing radio frequency (RF) cell sectors.

The configuration of components of network device 200 illustrated in FIG. 2 is for illustrative purposes. Other configurations may be implemented. Therefore, network device 200 may include additional, fewer and/or different components, that may be arranged in a different configuration, than depicted in FIG. 2.

Figure 3:
FIG. 3 illustrates an example of a SUCI which includes a network subscriber's concealed Subscription Permanent Identifier (SUPI)

FIG. 3 illustrates an example of a SUCI 300 which includes a network subscriber's concealed SUPI. A UE 105, when interacting with mobile network 110, may first encrypt its SUPI as ciphertext, using a public key that is part of a public key/private key pair provisioned by mobile network 110, and may insert the encrypted SUPI within SUCI 300. UE 105 may subsequently include SUCI 300 within various messages associated with interacting with mobile network 110 (e.g., registration requests, service requests, etc.) or when interacting with external entities, such as, for example, app 185 or app 195. SUCI 300 may contain a number of data fields, including a SUPI type field 305, a home network identifier (ID) field 310, a routing indicator field 315, a protection scheme field 320, a public key ID field 325, and a protection scheme output field 330.

SUPI type field 305 may store data that identifies a type of SUPI concealed in SUCI 300. The type of SUPI may be, for example, an IMSI or a Network Access Identifier (NAI). Home network ID 310 may store data that identifies the home network of the subscriber. When the SUPI type field 305 identifies an IMSI, then home network ID field 310 may identify a Mobile Country Code (MCC) and a Mobile Network Code (MNC) associated with the mobile network 110. When the SUPI type field 305 identifies a NAI, then home network ID field 310 may identify a string of characters with a variable length that represents a domain name (e.g., user@domain.com). Routing indicator field 315 stores routing data assigned by the home network operator and provisioned within the Universal Subscriber Identity Module (USIM) of the UE 105 associated with the SUPI concealed within the protection scheme output 330.

Protection scheme field 320 may store data that identifies the protection scheme used to encrypt the SUPI concealed as ciphertext within the protection scheme output 330. In some implementations, the protection scheme used may be an Elliptical Curve Integrated Encryption System (ECIES) protection scheme.

Public key ID field 325 stores data that identifies a particular public key, associated with the protection scheme identified in field 320, provisioned by mobile network 110 as part of a public/private key pair. The mobile network 110 may obtain a public/private key pair for a particular UE 105/mobile subscriber and provision the public key to the UE 105 and the private to UDM 160 for use by SIDF 197. Protection scheme output field 330 stores data that includes the SUPI, associated with the UE 105, that has been encrypted using the protection scheme identified by field 320 and the public key identified by field 325.

Figure 4:
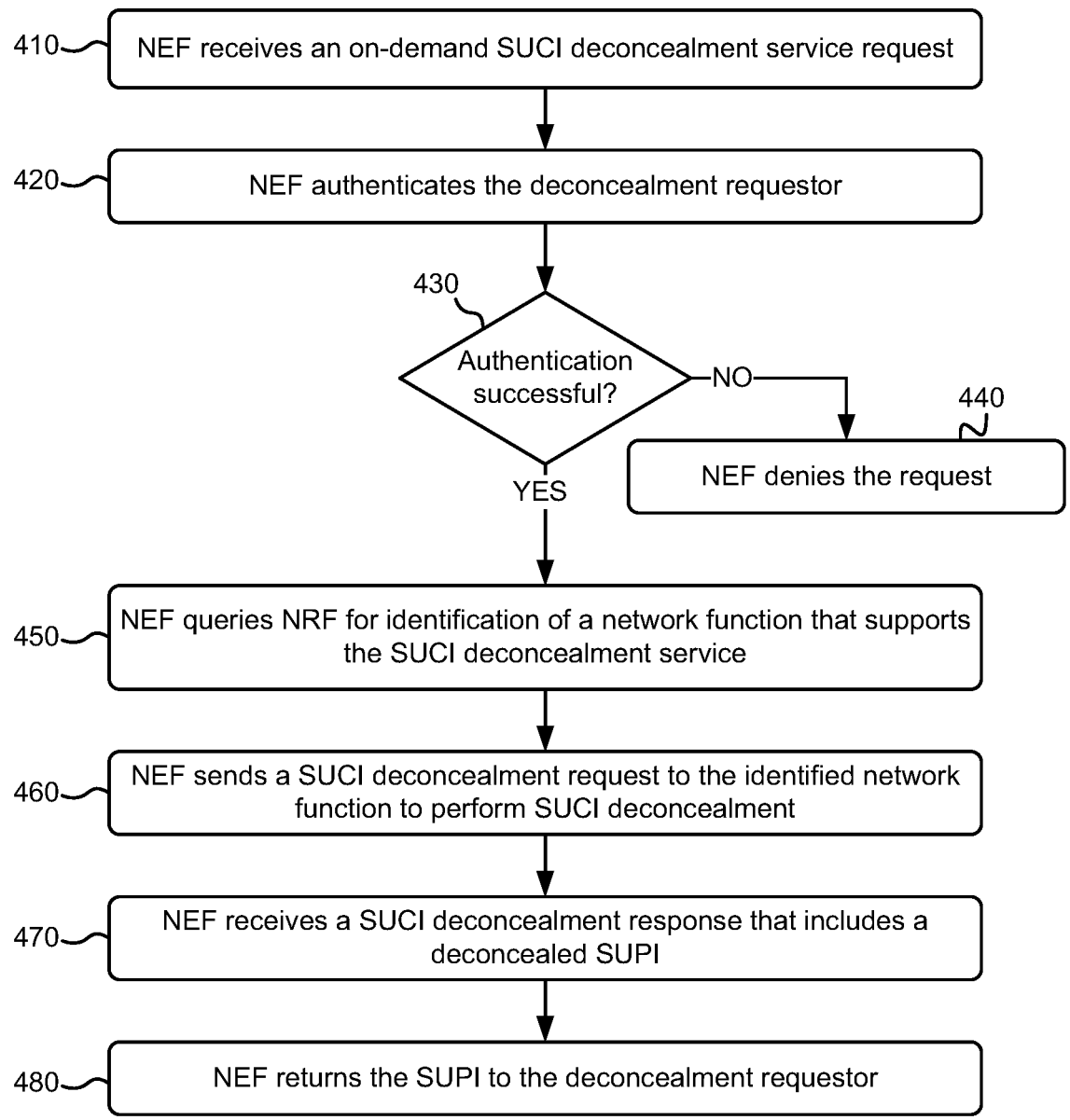
FIG. 4 is a flow diagram of an example process for on-demand SUCI deconcealment for select applications.

FIG. 4 is a flow diagram of an example process for on-demand SUCI deconcealment for select applications. In one implementation, the example process of FIG. 4 may be implemented by NEF 175. In other implementations, the example process of FIG. 4 may be implemented by one or more other NFs in mobile network 110. The example process of FIG. 4 is described with additional reference to FIG. 5.

Figure 5:
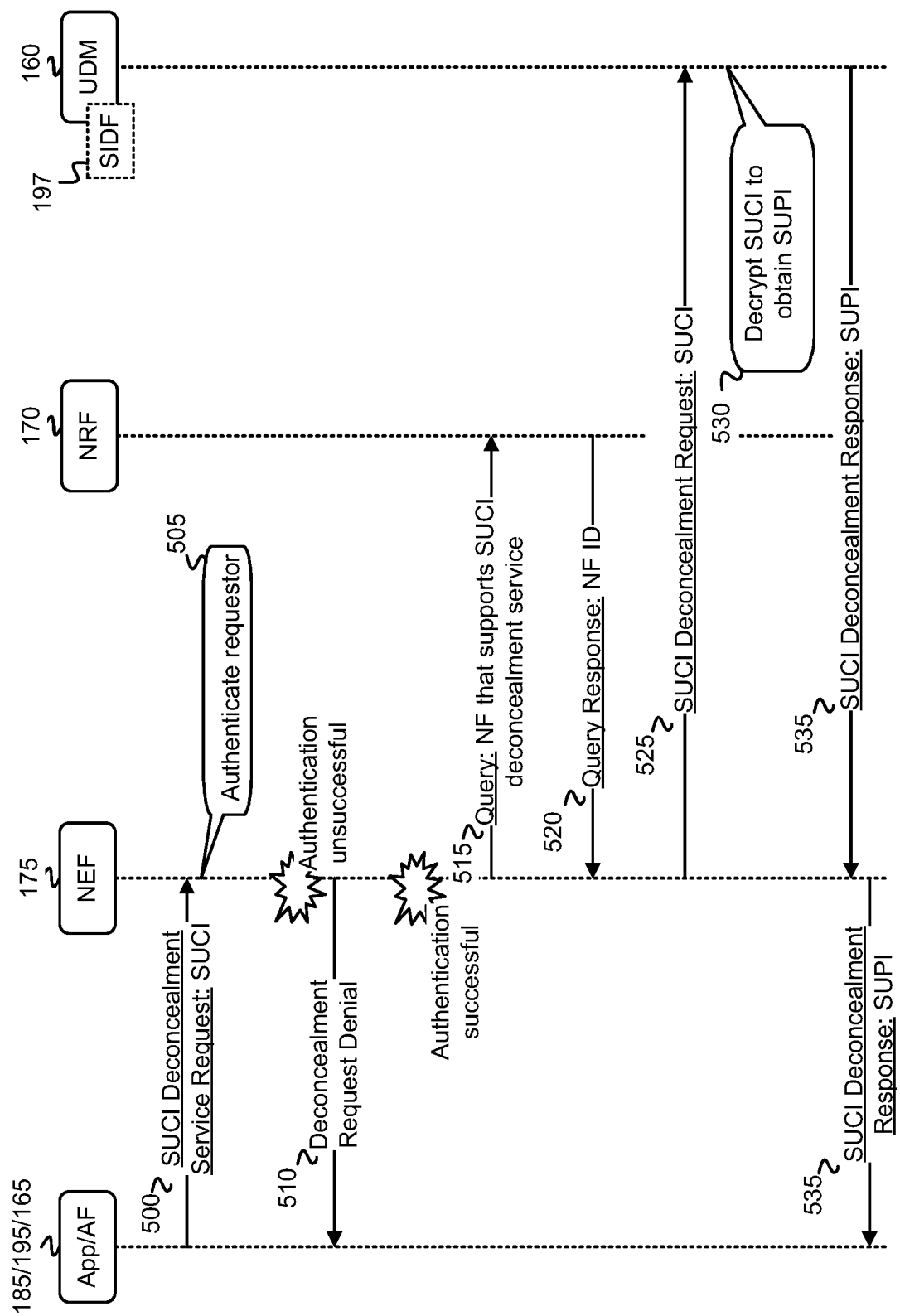
FIG. 5 depicts examples of operations, messages, and/or data flows associated with an example process.

The example process includes NEF 175 receiving an on-demand SUCI deconcealment request from a requestor (block 410). The SUCI deconcealment request may contain a SUCI associated with a particular UE 105 and/or subscriber 125 for which the requestor desires to have the SUPI decrypted from the SUCI. The SUCI deconcealment requestor may be an application 195 hosted by an MEC platform residing in an edge network 120, or an application 185 hosted by a network device 180 residing in a data network 115 (e.g., the Internet). The SUCI deconcealment requestor may further be an AF 165 in mobile network 110. FIG. 5 depicts NEF 175 receiving an on-demand SUCI deconcealment service request 500 from a requestor, shown as AF 165, app 185, or app 195.

NEF 175 authenticates the deconcealment requestor (block 420). Various different existing authentication schemes (e.g., X.509 client certificate, SecureID, Authentication Chain, JavaScript Object Notation (JSON) Web Token, etc.) may be used to authenticate and verify the identity of the SUCI deconcealment requestor, or to identify whether the SUCI deconcealment requestor is an authorized device or entity to request SUCI deconcealment. In some implementations, NEF 175 may authenticate the deconcealment requestor based on authentication data previously exchanged between NEF 175 and the requestor (e.g., during a SUCI deconcealment service registration process). FIG. 5 shows NEF 175 authenticating 505 the deconcealment requestor (e.g., authenticating AF 165, app 185, or app 195).

If the authentication is unsuccessful (NO-block 430), then NEF 175 returns a response denying the request (block 440). FIG. 5 shows NEF 175 returning a deconcealment request denial 510 to the requesting app/AF 185/195/165 when the authentication is unsuccessful. If the authentication is successful (YES-block 430), then NEF 175 queries NRF 170 for identification of a network function that supports the SUCI deconcealment service (block 450). FIG. 5 illustrates NEF 175 sending, when the authentication is successful, a query 515 to NRF 170 requesting identification of a network function that supports the SUCI deconcealment service. As further shown in FIG. 5, NRF 170 returns a query response 520 to the NEF 175 that includes an identifier (ID) for the NF (e.g., a network address) that supports the SUCI deconcealment service. In the example of FIG. 5, SIDF 197 of UDM 160 supports the SUCI deconcealment service, and NRF 170 returns the NF ID of UDM 160.

NEF 175 sends a SUCI deconcealment request to the identified network function to perform SUCI deconcealment (block 460). The SUCI deconcealment request includes the SUCI received by NEF 175 from the requester (e.g., app 185 or app 195) in block 410. FIG. 5 shows NEF 175 sending a SUCI deconcealment request 525 to UDM 160 that includes the SUCI that is requested to be deconcealed. As further shown in FIG. 5, upon receipt of SUCI deconcealment request 525, SIDF 197 of UDM 160 decrypts 530 the SUCI to obtain the SUPI. SIDF 197 may obtain the public key ID from field 325 of SUCI 300, and determine the protection scheme used to encrypt the SUPI based on field 320. SIDF 197 retrieves the private key (from local or remote memory storage) that corresponds to the obtained public key ID, and then decrypts the ciphertext data contained in field 330 of SUCI 300 using the retrieved private key and a decryption algorithm that corresponds to the determined protection scheme. In an example in which the protection scheme identified in field 320 is ECIES, SIDF 197 uses the retrieved private key and applies an ECIES decryption algorithm to the ciphertext contained in field 330. The decryption algorithm applied to the ciphertext from field 330 results in retrieval of the plaintext SUPI.

NEF 175 receives a SUCI deconcealment response that includes a deconcealed SUPI (block 470) and returns the SUPI to the deconcealment requestor (block 480). Subsequent to retrieval of the plaintext SUPI from the ciphertext contained in field 330 of the SUCI 300, UDM 160, as depicted in FIG. 5, sends a SUCI deconcealment response 535 to NEF 175 that includes the plaintext SUPI of the UE 105/subscriber 125. FIG. 5 further shows NEF 175 forwarding the received SUCI deconcealment response 535 to the deconcealment requestor (e.g., app 185, app 195, AF 165).

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIG. 4, and sequences of operations, messages, and/or data flows with respect to FIG. 5, the order of the blocks and/or the operations, messages, and/or data flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processing unit 220) of a device. A non-transitory storage medium includes one or more of the storage mediums described in relation to memory 230. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a Network Exposure Function (NEF) in a mobile network from a first data center residing in an edge network that is external to the mobile network, a first registration for preregistering with a Subscription Concealed Identifier (SUCI) deconcealment service prior to the first data center requesting execution of the SUCI deconcealment service for any one of multiple mobile network subscribers, wherein the first registration includes a first certificate associated with the first data center;
   receiving, from the first data center by the NEF subsequent to receipt of the first registration, a first (SUCI) deconcealment request associated with a first mobile network subscriber, that includes a first SUCI associated with the first mobile network subscriber and requests execution of the SUCI deconcealment service for the first mobile network subscriber;
   authenticating, by the NEF based on the first certificate of the first registration, the first data center for authorizing deconcealment of the first SUCI;
   obtaining, by the NEF from a mobile network Network Function (NF) based on successful authentication of the first data center, a first Subscription Permanent Identifier (SUPI), associated with the first mobile network subscriber, decrypted from the first SUCI by the mobile network NF; and
   forwarding, by the NEF via the edge network that is external to the mobile network, the first SUPI to the authenticated first data center.

2. The method of claim 1, wherein the first SUCI includes the first SUPI, encrypted as first ciphertext.

3. The method of claim 1, further comprising:
   querying, by the NEF, a Network Repository Function (NRF) to identify the NF, from among multiple NFs residing in the mobile network, as a NF that supports the SUCI deconcealment service.

4. The method of claim 1, wherein the first data center residing in the edge network comprises a Multi-Access Edge Computing (MEC) platform.

5. The method of claim 1, wherein the first data center provides, via the edge network that is external to the mobile network, at least one of first content, a first network service, or first results of an execution of one or more first functions to a first user equipment device (UE) associated with the first mobile network subscriber.

6. The method of claim 1, further comprising:
   receiving, by the NEF from a second data center residing in a data network that is external to the mobile network, a second registration for preregistering with the SUCI deconcealment service prior to the second data center requesting execution of the SUCI deconcealment service for any one of multiple network subscribers, wherein the second registration includes a second certificate associated with the second data center;
   receiving, from the second data center by the NEF subsequent to receipt of the second registration, a second SUCI deconcealment request, associated with a second mobile network subscriber, that includes a second SUCI associated with the second mobile network subscriber and requests execution of the SUCI deconcealment service for the first mobile network subscriber;
   authenticating, by the NEF based on the second certificate of the second registration, the second data center for authorizing deconcealment of the second SUCI;
   obtaining, by the NEF from the mobile network NF based on successful authentication of the second data center, a second SUPI, associated with the second mobile network subscriber, decrypted from the second SUCI by the mobile network NF; and
   forwarding, by the NEF via the data network that is external to the mobile network, the second SUPI to the authenticated second data center.

7. The method of claim 6, wherein the data network comprises one of a wide area network (WAN), a metropolitan area network (MAN) or the Internet, and
   wherein the second data center provides, via the data network that is external to the mobile network, at least one of second content, a second network service, or second results of an execution of one or more second functions to a second UE associated with the second mobile network subscriber.

8. A network device, comprising:
   at least one communication interface configured to communicate via a mobile network;
   a memory; and
   at least one processor coupled with the memory and configured to execute a Network Exposure Function (NEF) to:
   receive, via the at least one communication interface from a first data center residing in an edge network that is external to the mobile network, a first registration for preregistering with a Subscription Concealed Identifier (SUCI) deconcealment service prior to the first data center requesting execution of the SUCI deconcealment service for any one of multiple mobile network subscribers, wherein the first registration includes a first certificate associated with the first data center, receive, from the first data center via the at least one communication interface subsequent to receipt of the first registration, a first SUCI deconcealment request, associated with a first mobile network subscriber, that includes a first SUCI associated with the first mobile network subscriber and requests execution of the SUCI deconcealment service for the first mobile network subscriber, authenticate, based on the first certificate of the first registration, the first data center for authorizing deconcealment of the first SUCI, obtain, from a mobile network Network Function (NF), a first Subscription Permanent Identifier (SUPI), associated with the first mobile network subscriber, decrypted from the first SUCI by the mobile network NF, and forward, via the at least one communication interface and the edge network that is external to the mobile network, the first SUPI to the authenticated first data center.

9. The network device of claim 8, wherein the first SUCI includes the first SUPI, encrypted as first ciphertext.

10. The network device of claim 8, wherein the at least one processor is further configured to execute the NEF to:
query, by the NEF via the at least one communication interface, a Network Repository Function (NRF) to identify the NF, from among multiple NFs residing in the mobile network, as a NF that supports the SUCI deconcealment service.

11. The network device of claim 8, wherein the first data center residing in the edge network comprises a Multi-Access Edge Computing (MEC) platform.

12. The network device of claim 8, wherein the first data center provides, via the edge network that is external to the mobile network, at least one of first content, a first network service, or first results of an execution of one or more first functions to a first user equipment device (UE) associated with the first mobile network subscriber.

13. The network device of claim 8, wherein the at least one processor is further configured to execute the NEF to:
receive, via the at least one communication interface from a second data center residing in a data network that is external to the mobile network, a second registration for preregistering with the SUCI deconcealment service prior to the second data center requesting execution of the SUCI deconcealment service for any one of multiple mobile network subscribers, wherein the second registration includes a second certificate associated with the second data center, receive, from the second data center subsequent to receipt of the second registration, a second SUCI deconcealment request, associated with a second mobile network subscriber, that includes a second SUCI associated with the second mobile network subscriber and requests execution of the SUCI deconcealment service for the second mobile network subscriber;

authenticate, based on the second certificate of the second registration, the second data center for authorizing deconcealment of the second SUCI, obtain, from the mobile network NF, a second SUPI, associated with the second mobile network subscriber, decrypted from the second SUCI by the mobile network NF, and forward, via the at least one communication interface and the data network that is external to the mobile network the second SUPI to the authenticated second data center.

14. The network device of claim 13, wherein the data network comprises one of a wide area network (WAN), a metropolitan area network (MAN) or the Internet, and
wherein the second data center provides, via the data network that is external to the mobile network, at least one of second content, a second network service, or second results of an execution of one or more second functions to a second UE associated with the second mobile network subscriber.

15. A non-transitory storage medium storing instructions executable by a Network Exposure Function (NF) in a network device residing within a mobile network, wherein the instructions cause the NEF to:
receive, from a first data center residing in an edge network that is external to the mobile network, a first registration for preregistering with a Subscription Concealed Identifier (SUCI) deconcealment service prior to the first data center requesting execution of the SUCI deconcealment service for any one of multiple mobile network subscribers, wherein the first registration includes a first certificate associated with the first data center, receive, from the first data center subsequent to receipt of the first registration, a first SUCI deconcealment request, associated with a first mobile network subscriber, that includes a first SUCI associated with the first mobile network subscriber and requests execution of the SUCI deconcealment service for the first mobile network subscriber, authenticate, based on the first certificate of the first registration, the first data center for authorizing deconcealment of the first SUCI, obtain, from a mobile network Network Function (NF), a first Subscription Permanent Identifier (SUPI), associated with the first mobile network subscriber, decrypted from the first SUCI by the mobile network NF, and forward, via the edge network that is external to the mobile network, the first SUPI to the authenticated first data center.

16. The non-transitory storage medium of claim 15, wherein the first SUCI includes the first SUPI, encrypted as first ciphertext.

17. The non-transitory storage medium of claim 15, wherein the instructions further comprise instructions to cause the NEF to:
query, by the NEF, a Network Repository Function (NRF) to identify the NF, from among multiple NFs residing in the mobile network, as a NF that supports the SUCI deconcealment service.

18. The non-transitory storage medium of claim 15, wherein the first data center residing in the edge network comprises a Multi-Access Edge Computing (MEC) platform.

19. The non-transitory storage medium of claim 15, wherein the first data center provides, via the edge network that is external to the mobile network, at least one of first content, a first network service, or first results of an execution of one or more first functions to a first user equipment device (UE) associated with the first mobile network subscriber.

20. The non-transitory storage medium of claim 15, wherein the instructions further cause the NEF to:
   receive, from a second data center residing in a data network that is external to the mobile network, a second registration for preregistering with the SUCI deconcealment service prior to the second data center requesting execution of the SUCI deconcealment service for any one of multiple mobile network subscribers, wherein the second registration includes a second certificate associated with the second data center;
   receive, from the second data center subsequent to receipt of the second registration, a second SUCI deconcealment request, associated with a second mobile network subscriber, that includes a second SUCI associated with the second mobile network subscriber and requests execution of the SUCI deconcealment service for the second mobile network subscriber;
   authenticate, based on the second certificate of the second registration, the second data center for authorizing deconcealment of the second SUCI;
   obtain, from the mobile network NF, a second SUPI, associated with the second mobile network subscriber, decrypted from the second SUCI by the mobile network NF; and
   forward, via the data network that is external to the mobile network, the second SUPI to the authenticated second data center.

21. The non-transitory storage medium of claim 20, wherein the data network comprises one of a wide area network (WAN), a metropolitan area network (MAN) or the Internet, and
   wherein the second data center provides, via the data network that is external to the mobile network, at least one of second content, a second network service, or second results of an execution of one or more second functions to a second UE associated with the second mobile network subscriber.

* * * * *